United States Patent [19]

Morgan

[11] Patent Number: 5,230,908
[45] Date of Patent: Jul. 27, 1993

[54] MULTIPLE, HINGED SUPPORT CORE APPARATUS

[75] Inventor: Gary K. Morgan, Clear Lake, Minn.

[73] Assignee: Komo Machine, Inc., Sauk Rapids, Minn.

[21] Appl. No.: 774,692

[22] Filed: Oct. 9, 1991

[51] Int. Cl.⁵ .................... B29C 33/30; B29C 33/34; B29C 41/20
[52] U.S. Cl. .................. 425/117; 425/125; 425/183; 425/185; 425/188; 425/453; 249/83; 249/91; 249/184
[58] Field of Search ............. 425/111, 117, 125, 127, 425/183, 185, 188, 4 R, 817 R, DIG. 29, 453, 195; 249/83, 89, 91, 177, 178, 180, 184; 264/46.4

[56] References Cited

U.S. PATENT DOCUMENTS

| | | | |
|---|---|---|---|
| 3,801,059 | 4/1974 | Lippold | 249/152 |
| 4,133,621 | 1/1979 | Plocher et al. | 425/453 |
| 4,472,127 | 9/1984 | Cyriax et al. | 425/183 |
| 4,519,762 | 5/1985 | Ishihara et al. | 425/183 |
| 4,556,380 | 12/1985 | Abe et al. | 425/188 |
| 4,664,614 | 5/1987 | De Rossi | 425/185 |
| 4,691,906 | 9/1987 | Zastrow | 269/48.1 |
| 4,751,032 | 6/1988 | Salamon et al. | 425/817 R |
| 4,820,372 | 4/1989 | Gidseg | 264/46.5 |
| 4,923,381 | 5/1990 | Delmer et al. | 425/185 |

FOREIGN PATENT DOCUMENTS 60-174620 9/1985 Japan .................. 425/183
62-191114 8/1987 Japan .................. 425/183

Primary Examiner—Jay H. Woo
Assistant Examiner—Khanh P. Nguyen
Attorney, Agent, or Firm—Fitch, Even, Tabin & Flannery

[57] ABSTRACT

Disclosed is an apparatus which allows for selective employment of a plurality of collapsible support cores to provide shoring support to the interior walls of cabinets during insulating thereof. The cores can be selectively interchanged to utilize a core which corresponds to the size and shape of the particular cabinet to be insulated. Each of the support cores are insertable into the interior section of a cabinet and expanded therein to position a plurality of shoring panels, including separate corner shoring panels, into supporting engagement with the interior walls of a cabinet during insulating to prevent bulging of the interior walls associated with the insulating. After insulating, the core panels are retracted away from the cabinet interior walls so that the core can be inserted into and removed from the cabinet interior without contacting the interior surfaces during insertion nor removal. Particularly, the non-operative cores remain stationary as the selected operative core is expanded and collapsed.

13 Claims, 3 Drawing Sheets

MULTIPLE, HINGED SUPPORT CORE APPARATUS

BACKGROUND OF THE INVENTION

1. Field of the Invention

This invention relates to an apparatus and method for providing lateral support to cabinets during injection and curing of foam insulation, and more particularly to an apparatus and method for facilitating rapid changeover of support members between successive runs of differing cabinets.

2. Background of the Invention

Many types of cabinets, such as refrigerators and freezers, employ insulation surrounding the interior thereof to help maintain a desired internal temperature. Generally, such cabinets comprise a rear wall with depending side walls, wherein such walls have inner and outer surfaces with a small cavity therebetween. Insulating foam is injected into the cavity between the inner and outer surfaces of the rear and side walls. Due to the high foam injection pressures and expansion of the foam during curing, significant pressure is exerted on the interior and exterior walls of the cabinet. To resist undesirable bulging of the walls due to the pressure exerted thereon, shoring members are secured flush against the internal and external walls during the insulation process.

It is known to employ a collapsible core or plug for supporting the interior walls of cabinets whereby the core or plug is moved into and out of the interior of a cabinet to be insulated. After insertion of the core into the cabinet interior the core's plurality of shoring panels are extended to abut the cabinet interior to provide support thereto during curing. The core is collapsed, with the shoring panels retracted away from the interior walls of the cabinet, during insertion and removal of the core from the cabinet interior so as to prevent damage the cabinet interior thereupon.

It is also known to provide a mechanism for storing a plurality of different cores and means for automatically manipulating the different cores into an operative position for insertion within the cabinet interior. For instance, in DeRossi U.S. Pat. No. 4,664,614 a plurality of cores are carried on a common rotatable drum whereby the core desired for a given application is selectively rotated into position. Thereafter, the cabinets are raised and lowered into the foaming position by a vertically movable foaming jig. Similarly, in Zastrow U.S. Pat. No. 4,691,906 a plurality of cores are carried on a common rotatable drum and rotated into position. However, in this patent the selected core is lowered by a core carrier into the foaming position.

These devices suffer form numerous shortcomings. Amongst them, such rotating core-holding devices preclude an operator from working on one core concurrent with the interchangeable utilization of two or more other cores. That is, each of the cores are provided with tooling panels mounted thereon which tooling panels are interchangeable upon their respective cores to allow variations in the size and shape of a core by merely interchanging the tooling panels thereof. It is desirable to be able to perform a tooling panel changeover on a given core which is not in use while a plurality of other cores continue to be manipulated into and out of their operative positions. This would allow production to continue throughout any tooling panel changeovers, thereby increasing production significantly. Since current devices provide each of the cores on a common rotating component, each and every one of the cores thereon necessarily rotate simultaneously, and no one core can be maintained in a stationary position, as is necessary to perform a tooling panel changeover, while the other cores are moved into and out of position. It is therefore desirable to provide a means for selectively interchanging two or more support cores while the plurality of temporarily unutilized cores remain stationary.

Additionally, downtime associated with any malfunctions of the rotary drive precludes utilization of any one of the cores, thereby resulting in the complete interruption of production until the rotary drive is repaired. It is desirable to provide an alternative means for selectively bringing the desired cores into their operative positions whereby separate actuators are employed for each of the respective cores. This would allow production to continue with the remaining cores despite a malfunction of any one of the actuators.

Separate and apart from the malfunction problem, the high cost and complexity of the rotary drives of the prior art present obstacles to their use in many instances. The cores or plugs of the type used in the refrigerator and freezer industry are large and heavy requiring complex and expensive bearing and support structures for the rotary head core supports of the prior art. These heads must also include drive means, indexing and locating means all of which are required to handle the heavy loads resulting from the mounting of multiple cores or plugs.

Similarly, with current apparatus, a malfunction in any one of the cores, such as a simple hang-up in the expansion and retraction of the retractile panels thereof, would result in the complete interruption of production while the malfunctioning core is removed or repaired. Significant increases in production may be realized by apparatus having separate actuators for each of the separate cores whereby the malfunctioning core can be maintained in a stationary position and repaired thereat, concurrent with the remaining cores being selectively moved into and out of their operative positions.

The ability to interchange cores allows for increased production rates, as it is significantly more rapid to change cores to accommodate different sizes of cabinets than to perform a tooling panel changeover. For instance, with current production methods, it typically takes approximately four minutes to inject insulation and allow it to cure sufficiently to allow removal of the support core therefrom. An additional 900 more cabinets can be produced per year per shift with a mere five second decrease in this interval between insulating of successive cabinets. Thus, it can be readily appreciated that the increased production which could be realized by apparatus so constructed is significant.

It is desirable to provide such an apparatus which is simple and economical both in its manufacture and operation. Also it is desirable to provide such apparatus which is capable of fully automated operation.

SUMMARY OF THE INVENTION

In accordance With the present invention, a fixture is provided in which one or more collapsible cores for supporting the interior walls of cabinets, such as refrigerators or the like, are pivotally mounted along one edge thereof on the fixture frame so as to be able to be swung through a 180° arc from a first, storage position away from the foaming jig to a second, operative position in alignment with a fixture lift table whereat cabinets are lifted into registration with the operative core.

In the preferred embodiment, a rectangular fixture frame is provided having four separate collapsible cores pivotally mounted thereto, with one core pivotally attached to each of the four sides of the fixture frame. Separate actuators are provided at each of the cores to selectively swing the core to be employed in a particular application from the aforementioned first, storage position outward of the fixture frame into the central aperture of the fixture frame, corresponding to the aforementioned second, operative position. Each of the four cores operate independently, so that one or more cores can be worked on to perform tooling panel changes or the like while one or more other cores continue to be pivoted into and out of their operative positions. Also, since each core is provided with an independent actuator to effect its pivotal movement, an inoperable actuator will not completely interrupt production as was the case with previous designs.

After being pivoted to its operative position, the operative core remains in a fixed position within the central aperture of the fixture frame and the cabinets to be insulated are lifted upwardly into the foaming position whereby the core is inserted into the cabinet cavity. After elevation of the cabinet into registration with the operative core, the core is expanded within the cabinet interior to support the inner walls of the cabinet during injection and curing of insulating foam between the inner and outer walls of the cabinet. Simultaneously, exterior support means, such as retractile shoring panels, are moved into a supporting position in which said exterior support means abuts the exterior walls of said cabinet during the injection of insulation to provide support thereto during insulation.

Thereafter, upon completion of the insulating processes, the core is collapsed so that the retractile panels are withdrawn from the cabinet interior walls, and the exterior support means is withdrawn from the cabinet exterior walls, with the cabinet subsequently lowered out of registration with the core without damage to any detail of the cabinet interior or exterior wall surfaces. Dependent upon whether an identical or different cabinet is to be insulated next, either the core employed to support the previous cabinet is maintained in its operative position as another cabinet to be insulated is brought into registration therewith, or that core is pivoted out of its operative position to its storage position and a different core which is complementary to the size and shape cabinet to be run next is pivoted into the operative position for subsequent registration with the complementary cabinet to be insulated next. Accordingly, four different cores can be selectively pivoted into and out of operative positions, allowing for rapid changeover between successive runs of differing cabinets. The cores which are not in the operative position can be worked on while the remaining cores are interchanged.

BRIEF DESCRIPTION OF THE DRAWINGS

In the drawings, wherein like elements are referenced alike.

DETAILED DESCRIPTION OF THE PREFERRED EMBODIMENT

Figure 1:
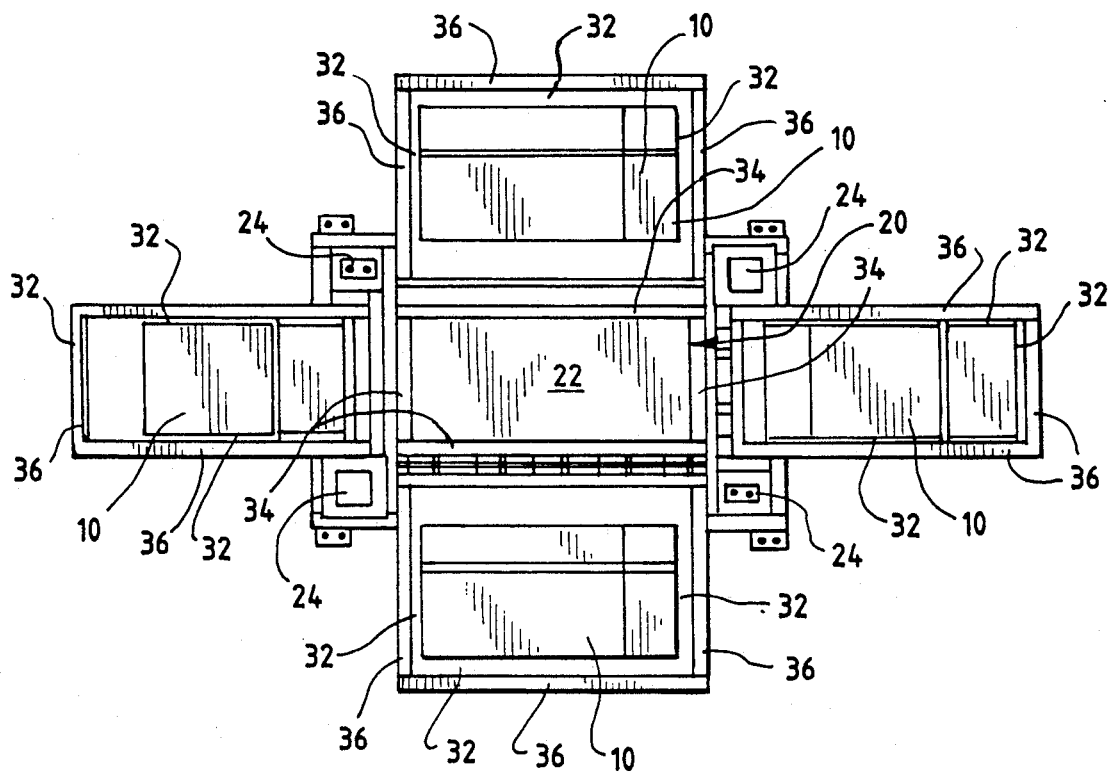
FIG. 1 is a top, elevational view of a multiple, hinged support core apparatus embodying various features of the present invention.
Figure 2:
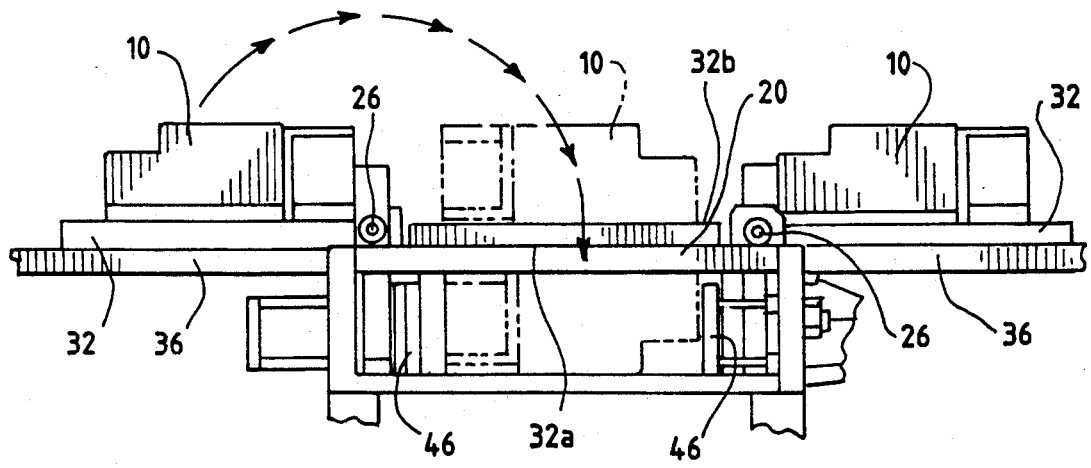
FIG. 2 is an enlarged, fractional side view of the multiple, hinged support core apparatus illustrated in FIG. 1.
Figure 3:
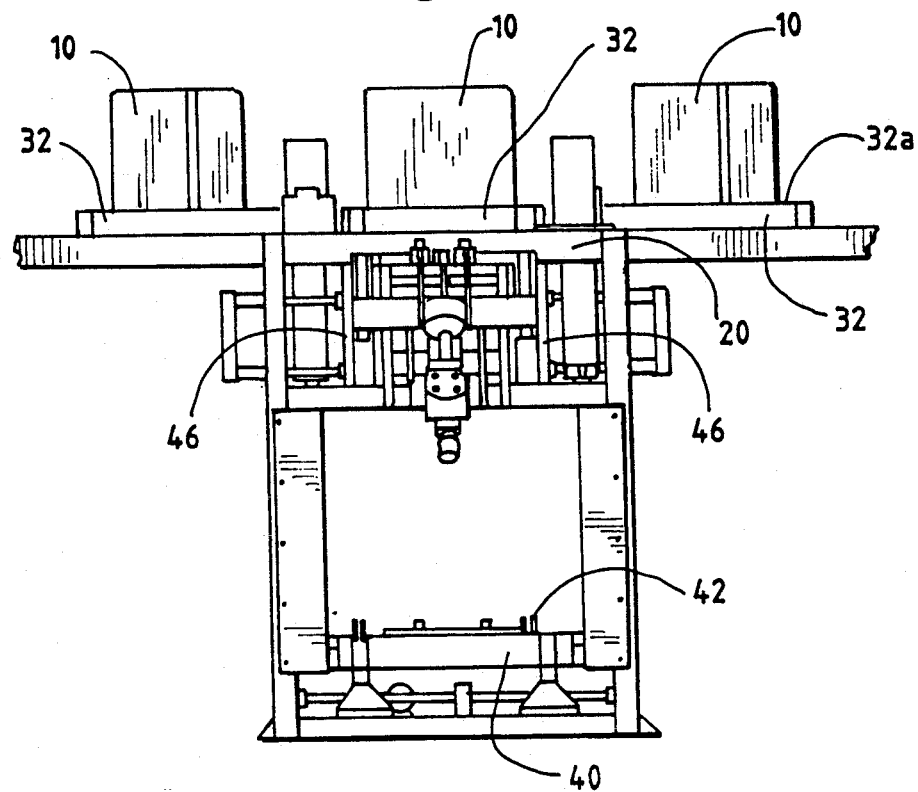
FIG. 3 is an end view of the multiple, hinged support core illustrated in FIG. 1.

FIGS. 1-3 show the preferred embodiment of an apparatus for selectively pivoting each of a plurality of support cores or plugs, each being indicated generally by reference numeral 10, into an operative position in which the operatively positioned support core supports the interior of a cabinet brought into registration therewith during injection and curing of insulating material between the inner and outer walls of the cabinet. The support cores which are not in the operative position are maintained stationary at a non-operative position where they can be worked on, for instance to change tooling panels or the like, while a plurality of cabinets are successively brought into registration with, and supported by, the operatively positioned support core.

Each of the support cores 10 include a plurality of retractile panels which are extended during insulation injection and curing operations to provide lateral shoring support to the interior surfaces of the cabinet being insulated to prevent bulging due to internal pressure associated with the insulating operation. The retractile panels, in turn, are each provided with means for mounting tooling plates thereupon which tooling plates have different surface configuration which are complementary to a respective cabinet interior surface configuration. Such interchanging of tooling panels provides flexibility to allow each of the cores supported in accordance with the present invention to support the interiors of cabinets having differing interior surface configurations by merely changing the tooling panels mounted on the retractile panels of the core. However, since it is quicker to pivotally interchange the support plugs being used, where possible, than it is to perform a tooling panel changeover, a plurality of support cores are employed which can be rapidly interchanged to support different shapes and sizes of cabinets. The removable tooling panels of a given plug are only altered to provide a differently shaped core exterior in a situation where there is no available core for rapid substitution.

Figure 5:
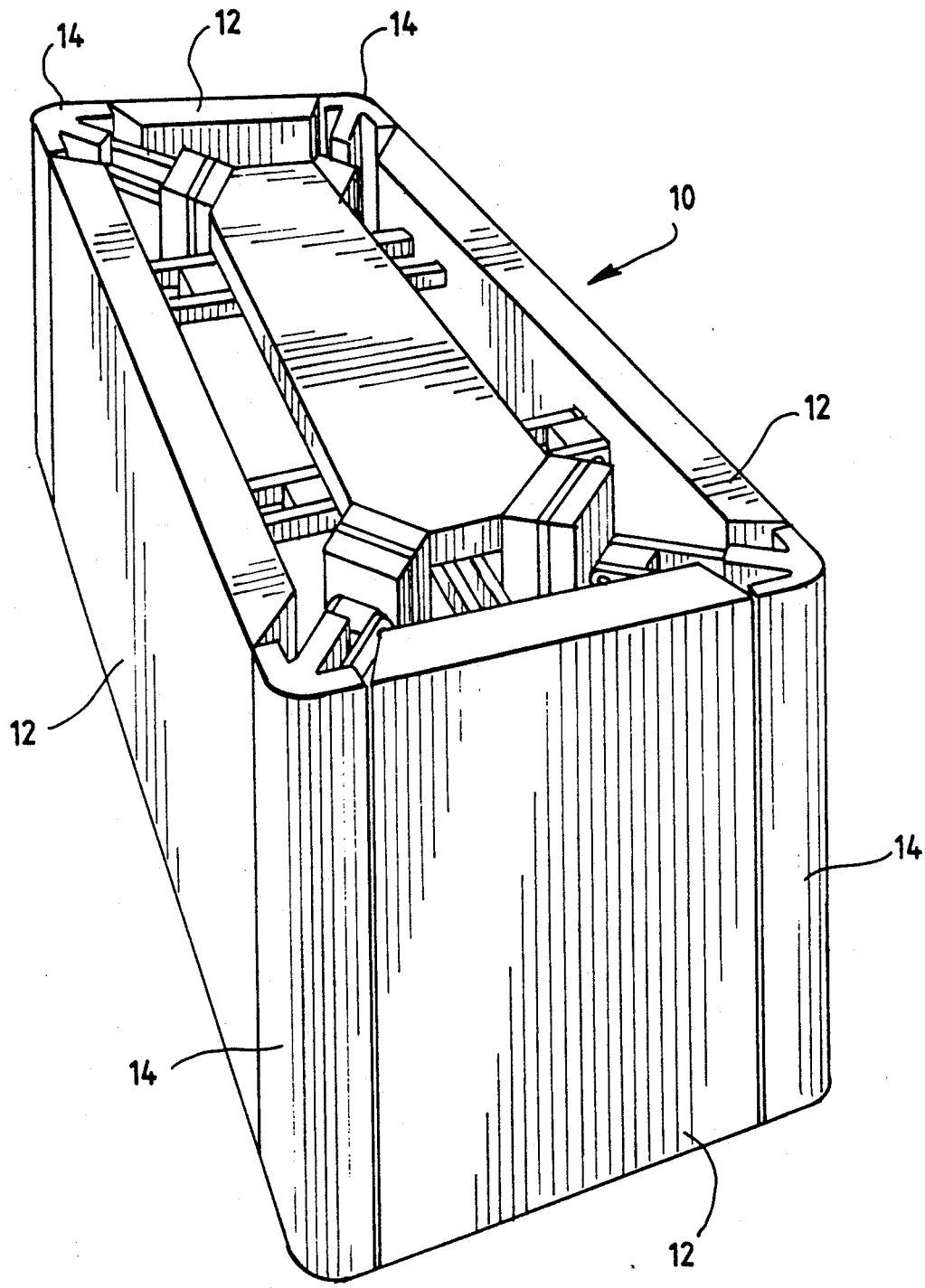
FIG. 5 is a perspective view of a support core suitable for use in the present invention.

The individual support cores may be of the type disclosed in the co-pending application having Ser. No. 07/773251 and entitled "Apparatus And Method For Supporting A Cabinet During Foam Injection" which is hereby incorporated by reference as if fully reproduced herein. As described in detail therein, the panels are retracted inward, away from the cabinet interior surfaces, during insertion of the core into the cabinet and during removal of the core from the cabinet interior so as to prevent the core from scratching the interior cabinet surfaces upon insertion and removal. With reference to FIG. 5, a core constructed in accordance with the aforementioned co-pending application is indicated generally at 10 to show one arrangement of core suitable for use in connection with the present invention. In this embodiment, four side tooling panels 12 having four corner tooling panels 14 interposed therebetween are retracted and extended to support the interior side surfaces of the cabinet while a bottom tooling panel remains stationary supporting the interior bottom surface of the cabinet. This core or plug design is merely illustrative of cores suitable for carrying out the present invention, and other core designs may be equally well suited. Since the invention is directed to the means for interchanging cores, an extended discussion of a specific core design is omitted.

The cores 10 are proportioned so that the outer surfaces of the tooling panels in their extended positions, as shown in FIG. 5, define a generally continuous outer core surface which is complementary to the interior surface of the cabinet to be supported. Each of the separate cores 10 employed in the present invention may be of a different size and/or configuration so that cabinets having different sizes and shapes can be insulated in succession with minimal plug changeover time between successive runs of differing cabinets.

In accordance with the present invention, and best seen in FIG. 1, each of the cores 10 are pivotally attached at one end thereof to a common fixture frame 20 having an open central area or central aperture 22 therein into which the cores 10 are selectively pivoted into and out of operative position to allow selective insertion and removal of each of the plurality of cores situated about the fixture frame 20 within the interior of a cabinet.

In the preferred embodiment, four cores 10 are pivotally attached about a rectangular fixture frame 20, wherein a separate core 10 is pivotally attached at each of the four sides of the fixture frame as illustrated in FIG. 1. While the invention is described in terms of a rectangular fixture frame 20 having four cores 10, other fixture frame and core configurations may be employed without departing from the essential scope of the invention which is characterized by the independent pivotal movement of the plurality of cores. Core configurations of 1, 2, 3 or 4 cores are contemplated as clearly falling within the scope of the invention. Thus, a fixture frame having only one core may be sold initially, with additional cores affixed to the apparatus over a period of time as they are required.

Figure 4:
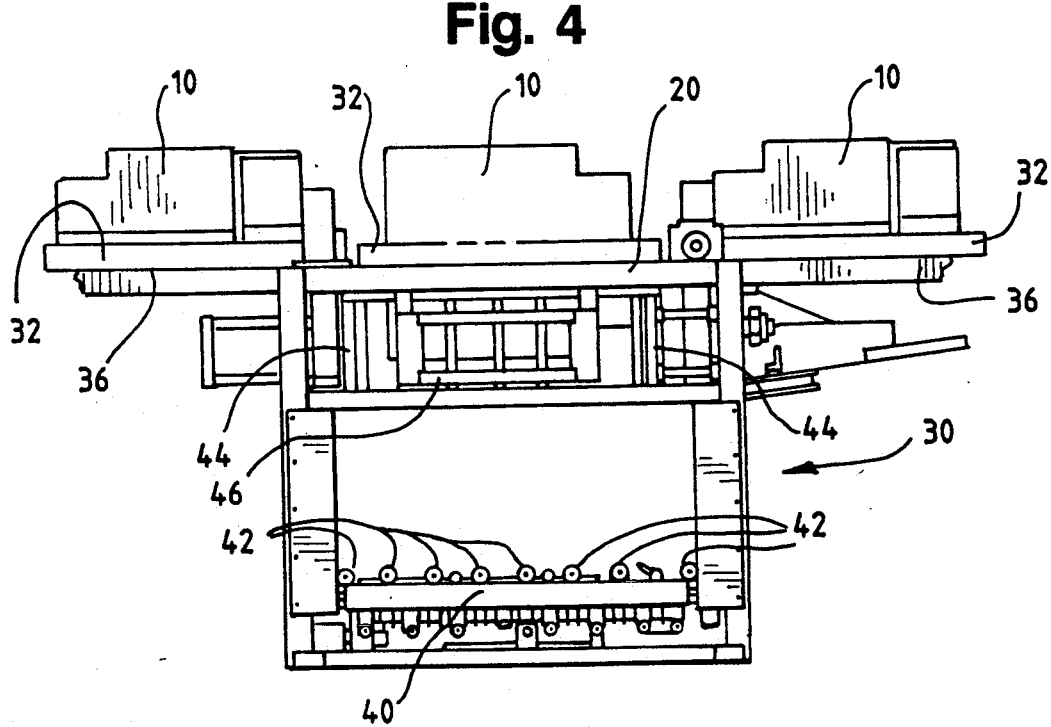
FIG. 4 is a side view of the multiple, hinged support core apparatus illustrated in FIG. 1.

Each of the cores 10 is actuated into and out of the operative position independent of the other cores. In the preferred embodiment, separate hydraulic rotary actuators 24 are operatively attached to each of the respective axles 26 about which the respective cores pivot. Actuation of the hydraulic rotary actuator 24 of a selected core 10 effects swinging of that core through approximately 180° about its axle 26 to move the core 10 between its non-operative position and its operative position. As best seen in FIG. 4, the fixture frame 20 is supported at the upper end of the foaming jig 30 and, accordingly, the cores 10 are supported on and mounted for pivotal movement on the upper end of the foaming jig 30 which serves as a supporting frame.

Each of the cores 10 include a base portion 32 which is larger than the perimeter of the outer surface of that core 10 providing a peripheral shoulder 32a which is spaced from and faces in the opposite direction from the flat face 32b of the base portion 32. Accordingly, upon pivoting of a core 10 to its operative position, the pivotal movement of the core is terminated upon the peripheral shoulder 32a of base portion 32 abutting and resting upon the top surface 34 of the fixture frame 20 with the face 32b of the base portion 32 facing upwardly. With the base portion 32 resting on the top surface 34 of the fixture frame 20, the core 10 extends downward through the rectangular aperture 22 in the fixture frame 10 in its operative position. Similarly, the foaming jig 30 includes a mezzanine 36 at its upper end upon which each of the cores rest on the face 32b of the base portion 32 when in their non-operative or storage positions.

A selected core 10 having been pivoted to its operative position with its panels retracted, a cabinet is then transported into the lower end of the foaming jig 30. In the preferred embodiment, the foaming jig 30 includes a hydraulically actuated lift table 40 onto which the cabinets are transported. However, the lift table may be actuated by any means, such as by electric or pneumatic means. The lift table 40 includes a plurality of cone shaped rollers 42 which act to bias the cabinet in the direction of the cone vertex to assure accurate registration of the cabinet on the lift table 40 prior to elevation of the lift table. Other methods of achieving cabinet registration, such as employment of flat conveyor rollers or a belt with a cabinet positioning device, are equally well suited for carrying out the invention.

Upon registration of a cabinet beneath the core 10, the lift table 40 raises the cabinet to be insulated upward until the core 10 which has been pivoted to the operative position is inserted into the interior section of the cabinet to be insulated. Thereafter, the core 10 in the operative position is expanded within the cabinet interior to support the inner walls of the cabinet, as described below, during the insulating process. The operative core 10 is maintained in its expanded position, supporting the inner walls of the cabinet, until completion of the insulation injection and curing operations. In their expanded positions, the outer surfaces of the tooling panels form a generally continuous surface and there may be only approximately 0.1 inch gaps between adjacent panels, which gaps are sufficiently narrow to preclude bulging thereat.

The retractile panels of the operative core 10 are then drawn in, away from the cabinet inner walls, whereafter the lift table 40 lowers the cabinet back downward to the lower end of the foaming jig 30. Thereafter, if the core in the operative position in the foaming jig 30 is not to be reused for the next cabinet the actuator 24 of the respective operative core 10 pivots the operative core 10 from inside the fixture frame 20 to its non-operative or storage position outside the fixture frame 20

The remaining cores 10 are maintained pivoted at their respective non-operative or storage positions, supported upon the mezzanine 36, and remain stationary thereat as the panels of the selected operative core 10 are extended and retracted. The lift table 40 may be actuated either manually or in an automated process employing a feedback and control type system between the lift table and a cabinet advancement mechanism which advances the cabinets into and out of registration beneath the core 10. For instance, the cabinets can be bar coded to indicate the particular shape of cabinet being brought into the foaming jig 30. A conventional bar code scanner can then be employed to scan the bar coding on the particular cabinet being brought into the foaming jig 30 and actuate the appropriate core actuators 24 to pivot the appropriate core 10, as dictated by the requirements of the particular cabinet to be supported, into the operative position. Accordingly, the core 10 provides support to the entire interior surface of cabinets which are successively passed therebeneath. Alternatively, the same core 10 may be maintained in the operative position with the plurality of appliance cabinets sequentially elevated into registration therewith.

Additionally, the foaming jig 30 of the preferred embodiment further includes side gates 44 and end gates 46 which are moved hydraulically, pneumatically, or electromechanically into abutment with the exterior side and end surfaces of the cabinet being insulated to provide shoring support to the outer or exterior cabinet walls during insulation injection and curing. Thus, during the injection and curing of insulating foam between the cabinet inner walls and outer walls, the inner walls of the cabinet are supported by the retractile panels 12 and 14 of the support core 10, while the outer walls of the cabinet are supported by the side gates 44 and end gates 46. Accordingly, each of the inner and outer walls of the cabinet are provided with shoring support to prevent bulging thereof associated with insulating.

Thus, with apparatus constructed in accordance with the present invention, any of four separate support cores 10 can be pivoted into an operative position to provide shoring support to the interior of a cabinet during injection and curing of insulation and the cores 10 can be rapidly interchanged as desired by merely pivoting the desired cores needed to support a subsequent cabinet having a differing shape. The non-operative cores being maintained in a stationary position, for instance two cores remaining stationary as cabinets having interior surfaces complementary to the two other cores which are alternately pivoted into and out of the operative position, allows work to be performed on the stationary, non-operative cores without interrupting production. That is, significant reductions in down time are realized by apparatus constructed in accordance with the present invention by planning production ahead so that while an extended run of cabinets corresponding to, say, two different core configurations are run, with the two other cores 10 unutilized and therefore remaining stationary in their respective non-operative positions, tooling plate changes or other work can be performed on the two unutilized cores 10 while the two operative cores are utilized. Thereafter, extended runs of cabinets corresponding to the core configurations of the two cores which just had their tooling panels changed are carried out with the two cores previously employed now pivoted and maintained in their respective non-operative positions. Accordingly, since the tooling plate changes can be made while the other plugs are being utilized, there is no production interruption required to effect tooling plate changeovers on the cores wherein the aforementioned production cycle is employed. Additionally, since the cores 10 are each operable and pivotal independent of each other, neither malfunction of any one or more of the hydraulic rotary actuators 24 nor of any one or more cores 10 will preclude continued production utilizing the remaining functional cores.

Also, in certain production situations it may be desirable to employ a larger number of support cores 10 than the number of cores mounted on a single fixture frame 20. In such situations, a plurality of fixture frames 20 may be maintained, each fixture frame having its respective plurality of support cores 10 mounted thereto which are pivotal between operative and non-operative positions when that fixture frame 20 is mounted to the foaming jig or support frame 30. That is, the plurality of fixture frames 20 may be removably attached to the support frame or foaming jig 30 and interchangeable thereupon to allow employment of a virtually unlimited number of support cores 10 in conjunction with apparatus constructed in accordance with the present invention. The cores 10 supported upon a fixture frame 20 which is not in use at a given time remain stationary and tooling panel changes or the like can be performed on such cores without any interruption in production time. The plurality of fixture frames 20 can be interchanged upon the support frame or foaming jig 30 by employment of a crane or other suitable hoist, or else by an automated mechanism.

While the invention has been described with reference to a preferred embodiment, it will be understood to those skilled in the art that various changes may be made and equivalents may be substituted for elements thereof without departing from the scope of the invention. For instance, it is readily appreciated that a gear train or the like may be employed to effect the requisite pivotal translation of the cores into and out of the operative position without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for selectively engaging one of a plurality of support cores with the interior walls of cabinets during insulation of such walls comprising:

a support frame;

a fixture frame defining a central aperture and being mounted on said support frame, said fixture frame being generally rectangular and having four edges;

a plurality of support cores mounted on said support frame in storage positions horizontally displaced adjacent the edges of said fixture frame, each support core having at least a pair of support surfaces for supporting engagement with the interior surfaces of said interior walls of cabinets, means pivotally connecting each of said support cores to said support frame for rotational movement from said storage position to an operative position within the central aperture of said fixture frame, each said support core being moveable independently of the other support cores, cabinet translating means for moving a cabinet into an operative position with a support core in operative position within the interior of said cabinet to provide support to said interior walls during insulation of said cabinet.

2. The combination of claim 1 wherein said support cores in said storage position are disposed in an inverted position and pivoted about a horizontal axis through an angle of 180° as rotated to said operative position.

3. The combination of claim 1 wherein each said support core is includes a plurality of extendable and retractable support panels adapted to be received within and support said interior cabinet walls, said support core including a core base portion on which said panels are mounted, said core base portion being pivotally attached along one edge to said support frame and supporting each said support core in an inverted position in said storage position and an upright position when each said core is pivoted to said operative position.

4. The combination of claim 3 wherein each said core base portion includes a peripheral shoulder disposed above said support panels when said core is in said operative position and engageable with said fixture frame to support and locate each said core in said operative position.

5. The combination of claim 4 wherein said core base portion of each said core is pivoted through an angle of 180° about a horizontal axis in moving between said operative position and said storage position, said support frame including means extending laterally and horizontally from said fixture frame to support each said core in its storage position.

6. The combination of claim 1 including separate rotary actuator means connected to each said support core to rotate each said support core between said operative and storage positions, and cabinet transfer means for moving a cabinet to be insulated into operative engagement with one of said support cores in said operative position.

7. Core application apparatus for use in the foam insulation of the interior space between the inner and outer walls of cabinets comprising:
  a support frame;
  a fixture frame mounted on said support frame and defining a central aperture;
  means for supporting a plurality of support cores on said support frame for pivotal movement between a storage position displaced from said fixture frame and an operative position within said central aperture;
  each said support core having a base portion which in said storage position supports said support core in an inverted position on said support frame, said base portion being pivotally connected to said support frame along one edge adjacent said fixture frame, said base portion engaging said fixture frame to mount said core extending downwardly through said central aperture upon rotation of said support core from said storage position to said operative position; and
  said fixture frame being generally rectangular and there being means for supporting at least two support cores, each being at a different edge of said fixture frame.

8. The combination of claim 7 wherein said support cores in said storage position are pivoted about a horizontal axis through an angle of 180° as rotated to said operative position.

9. The combination of claim 7 wherein each said support core includes a plurality of extendable and retractable support panels adapted to be received within and support said inner cabinet walls.

10. The combination of claim 9 wherein each of said support cores include a core base portion on which said panels are mounted, said core base portion being pivotally attached along one edge to said support frame and supporting each said support core in an inverted position in said storage position and an upright position when said core is pivoted to said operative position.

11. The combination of claim 10 wherein each said core base portion includes a peripheral shoulder disposed above said support panels when said core is in said operative position and engageable with said fixture frame to support and locate each said core in said operative position.

12. The combination of claim 11 wherein said core base portion of each said core is pivoted through an angle of 180° about a horizontal axis in moving between said operative position and said storage position, said support frame including means extending laterally and horizontally from said fixture frame to support each said core in its storage position.

13. The combination of claim 7 including separate rotary actuator means connected to each said support core to rotate each said support core between said operative and said storage positions, and cabinet transfer means for moving a cabinet to be insulated into operative engagement with one of said support cores in said operative position.

* * * * *